United States Patent

[11] 3,542,052

[72] Inventor Donald W. Irwin
 Marshalltown, Iowa
[21] Appl. No. 750,306
[22] Filed Aug. 5, 1968
[45] Patented Nov. 24, 1970
[73] Assignee Fisher Governor Company
 a corporation of Iowa

[54] RELIEF MONITOR FOR GAS SERVICE
 6 Claims, 3 Drawing Figs.
[52] U.S. Cl. .................................................. 137/116.5,
 137/489, 137/505.11, 137/461, 137/613
[51] Int. Cl. .................................................. F16k 17/02
[50] Field of Search.................................................. 137/116.5,
 489.5, 98, 489, 505.11, 491, 456, 458, 613, 461,
 505.12

[56] References Cited
UNITED STATES PATENTS
2,698,026 12/1954 Roberts........................ 137/548
3,032,054 5/1962 Irwin............................ 137/116.5
3,228,417 1/1966 Schwerter.................... 137/461
3,424,194 1/1969 Kruzan......................... 137/461

Primary Examiner—William F. O'Dea
Assistant Examiner—William H. Wright
Attorney—Malinare, Allegretti, Newitt & Witcoff ABSTRACT: A relief monitor is operatively connected to a gas service regulator to prevent excessive downstream pressure that can damage the connected appliances and equipment. The relief monitor includes a valve cooperating with valve seat means upstream of the regulator valve means, the relief monitor valve being operatively responsive to downstream pressure to control gas flow to the regulator valve means and being automatically reset after the excessive downstream pressure condition is obviated. Such relief monitor functions in cooperation with the internal relief valve in the service regulator to afford the desired protection.

Patented Nov. 24, 1970
3,542,052
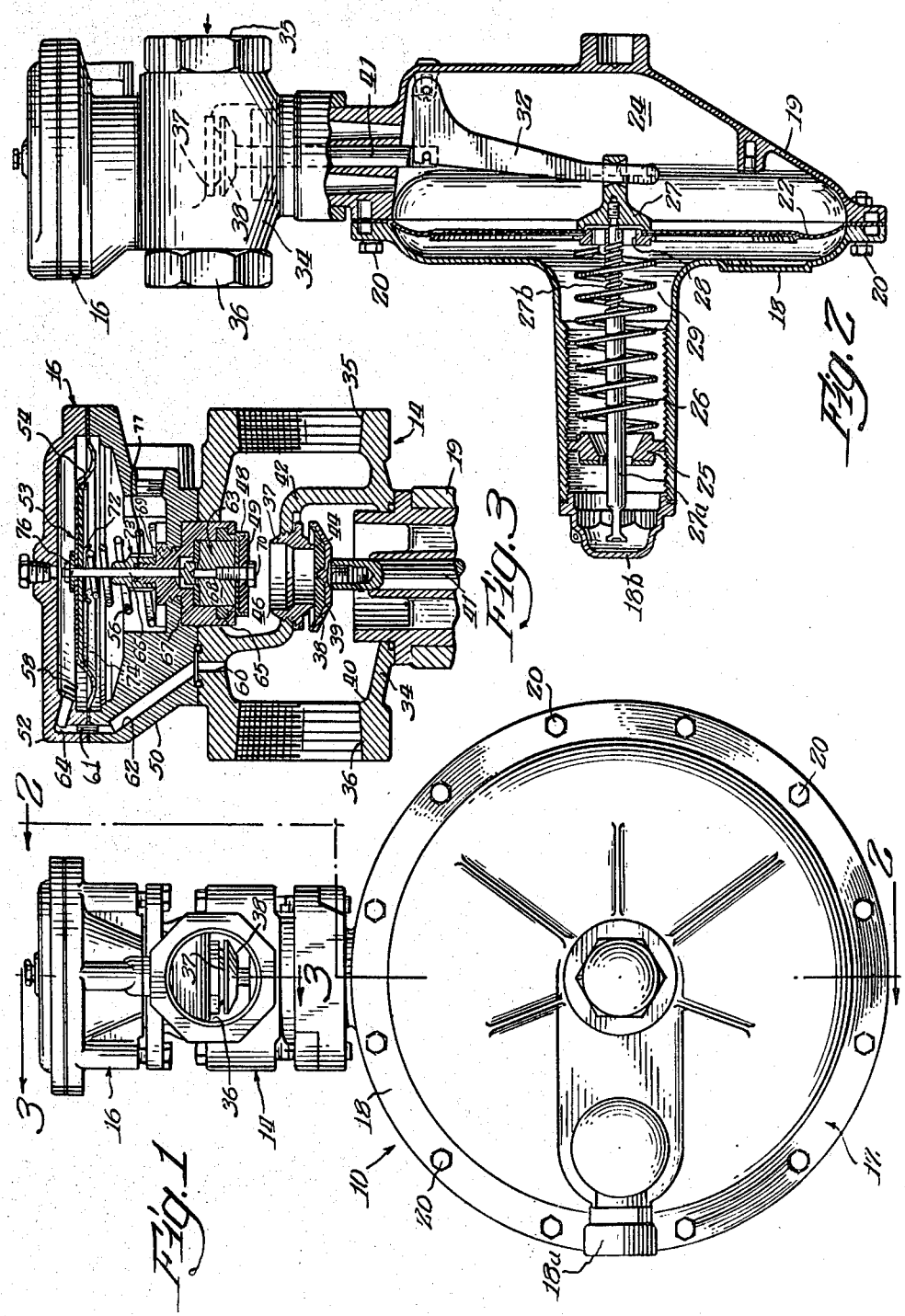
INVENTOR
Donald W. Irwin
BY
Buis Freeman & Molinare
ATTORNEY 3,542,052

RELIEF MONITOR FOR GAS SERVICE

BACKGROUND OF THE INVENTION

This invention relates to gas service regulators in general, and, more particularly, to a gas service regulator incorporating a relief monitor for protecting the downstream connected appliances and equipment from excessive pressure, should the service regulator malfunction for any reason.

In gas service regulators for residential use, it is quite common practice to install relief valves as an integral part of the service regulator or as a separate item. Such relief valves function to protect the downstream system from excessive pressure.

If the inlet pressure to the resident or house service regulator is high, it is necessary to have relief valves of very high capacity in order to vent all of the gas that can pass through a wide open orifice or passage in the service regulator. It is not too practical to build relief valves with the required high capacities for such applications, and, furthermore, if the discharge of gas is to atmosphere, the amounts of gas vented can be dangerous.

One known arrangement for overcoming this problem has been to provide a high pressure safety shutoff valve which closes the line upstream of the service regulator in the event the downstream pressure exceeds a predetermined value. A disadvantage of such high pressure safety shutoffs is that manual resetting is necessary to restore service to the installation.

Another arrangement is to provide a monitor regulator to control pressure at some higher predetermined level should the main regulator fail. This method usually requires larger regulators with the resultant higher initial installation cost.

An object of the present invention is to provide an improved service regulator mechanism incorporating a compact relief monitor which protects the downstream system from excessive pressure with a limited capacity atmospheric discharge from the service regulator relief valve and which is automatically reset after the condition causing the excessive downstream pressure is obviated. Other objects and advantages of the present invention will be made more apparent hereinafter.

BRIEF DESCRIPTION OF THE DRAWING

A presently preferred form of the invention is illustrated in the accompanying drawing wherein like numerals refer to like elements and wherein:

FIG. 1 is a plan view of a service regulator embodying the relief monitor of the present invention;

FIG. 2 is a cross-sectional view taken generally along the line 2–2 of FIG. 1; and FIG. 3 is an enlarged cross-sectional view taken generally along line 3–3 of FIG. 1 and better illustrating the construction of the relief monitor.

DESCRIPTION OF THE PREFERRED EMBODIMENT OF THE PRESENT INVENTION

Referring to FIGS. 1 and 2, there is illustrated a top view and a partial section, respectively, of a service regulator 10 embodying the present invention. The service regulator is comprised of three main sections, a regulator 12, a valve means 14 and a relief monitor 16. The body means of the service regulator 10 may be unitary or it may be comprised of separate interconnected sections as shown.

The regulator 12 comprises a housing or casing made of two portions 18 and 19 joined together by suitable fastening means, and, for example, screws 20. Clamped between the main body part or diaphragm casing 19 and the top body part or cover 18 is a diaphragm assembly which includes diaphragm 22. The diaphragm 22 is moved in one direction by the force acting on the face of the diaphragm exposed to pressure within chamber 24. The diaphragm assembly is urged in the opposite direction by spring 26.

The regulator 12 is of known construction and will not be further described in detail. Reference may be made to Irwin U.S. Pat. No. 3,032,054 granted May 1, 1962, for a more detailed description of the regulator and its operation. The function of the regulator 12 will be described hereinafter insofar as it is interrelated with the operation of the relief monitor. Other regulators incorporating a pressure responsive control means with internal relief to control a valve in a valve body may be substituted for that shown without affecting the function of the relief monitor.

The regulator casing is secured to the valve body 34 by suitable fastening means, for example, bolts and nuts and the relief monitor 16 is secured to the valve body 34 by suitable fastening means, for example, bolts or machine screws.

The valve body 34 of valve means 14 includes an inlet 35 adapted to communicate with a source of gas under pressure, for example, a service line, and an outlet 36 adapted to be connected to a use point, for example, an appliance which requires a predetermined downstream pressure for operation. Within the valve body 34 is a valve seat means 37 which cooperates with a valve 38 to control the fluid flow through the valve body. The valve 38 is operatively connected to the diaphragm assembly of regulator 12 through valve stem 41 and linkage 32 and is responsive to movement of the diaphragm assembly in response to pressure variation in chamber 24. As shown, valve 38 includes a threaded stub portion engaging within a threaded opening in valve stem or valve rod 41 so as to secure the valve to the valve rod.

The service regulator 10 is provided with a small internal relief valve and with a safety stop which functions if the internal parts of the service regulator 10 fail. Linkage 32 is connected at one end with a valve member 27 that is adapted to bear against the diaphragm 22 and normally close an opening through the diaphragm. In the event of excessive pressure in chamber 24, the diaphragm 22 will be moved with respect to the valve member 27 to permit relief of pressure from chamber 24 through the opening 28 in the diaphragm assembly to the chamber 29. The gas may be vented from chamber 29 through vent means 18a. Spring 27b functions to bias the valve member 27 against the diaphragm assembly to terminate flow through opening means 28. If the internal parts of the regulator fail, the diaphragm assembly will be moved to the left as viewed in FIG. 2 until the pusher post 27a engages the cap 18b which closes the bonnet portion of cover 18. Upon continued movement of the diaphragm assembly with respect to the valve member 27, which is connected to the pusher post 27a, the diaphragm assembly and valve member will separate to permit relief of pressure from chamber 24.

Turning to FIG. 3, there is better shown the details of relief monitor 16 and the cooperative relationship between the relief monitor and the other components of the service regulator 10. The inlet 35 and the outlet 36 of the valve body 34 are communicated to one another by a flow passage 40 defined in the valve body. Provided in a wall member 42 within the valve body is the annular valve seat member 37 which includes a first valve seat or downstream valve seat 44 and a second or upstream valve seat 46. The valve 38 cooperates with valve seat 44 to control fluid flow. The valve 48 of the relief monitor cooperates with the valve seat 46.

The relief monitor 16 comprises a housing or casing including a main part 50 and a cover part 52 suitably joined to the main part. Disposed within the relief monitor housing is a pressure responsive means for moving valve 48. As shown, the pressure responsive means comprises a diaphragm assembly 53 including a diaphragm 54 biased in one direction by spring 56 and urged in the opposite direction by the pressure force in chamber 58 defined between diaphragm 54 and cover 52. The chamber 58 receives downstream pressure via passage means comprising opening 60 in body 34, passage 62 in main body part 50 and passage 64 in cover part 52. Diaphragm 54 is provided with holes for receiving screws that connect cover 52 to body 50 and an extra hole for receiving alignment tube 61 which assures proper placement of the cover on the body so that downstream pressure may be registered on the top of diaphragm 54. The tube 61 further reduces the likelihood of gas leakage between cover 52 and body 50. Diaphragm assembly 53 actuates a valve stem means 63 connected to valve 48 whereby the valve 48 is moved toward and away from valve seat means 37 responsive to the movement of diaphragm 54. Valve 38 includes resilient disc facing 39 and valve 48 similarly includes resilient disc face 49. The resilient disc facings ensure a tighter seal between the valves and their associated valve seat means.

The valve stem 63 includes a valve stem 66 secured to a block 68. The valve 48 and its facing 49 are connected to block 68 by suitable fastening means, as, for example, machine screw 70. The valve stem 66 extends through annular spring backup washer 72, diaphragm backup plate 74 and diaphragm 54 and receives a nut 76 on its threaded outer end. Spring 56 bears at one end against washer 72 and at its other end against a shoulder in main body part 50 of the relief monitor. Wiper 65 coacts between block 68 and housing 67 secured in body 50. Guide 69 is located at the top of housing 67 and the parts 67 and 69 coact to guide the stem means 63 for reciprocal movement in the relief monitor. A pressure seal nut 73 is disposed around valve stem 66 and is threadedly secured to guide portion 69. An 0-ring is clamped between parts 67 and 69 to form a pressure seal.

In operation, the valve 38 is responsive to the pressure differential between the force in chamber 24 urging diaphragm 22 in one direction and the biasing force of spring 26 urging the diaphragm in the opposite direction. The valve 38 is responsive to the diaphragm assembly of the regulator 12 to maintain a predetermined downstream pressure. Spring 26 may be adjusted by means of adjustment nut 25 in the bonnet portion of the regulator housing to a desired control value.

Normally, the predetermined downstream pressure will be insufficient to move the relief monitor diaphragm 54 in opposition to the force of spring 56, and the valve 48 will be away from the valve seat 46. Should the downstream pressure increase from a failure in the service regulator 10, the pressure will build up in chamber 58. When the pressure force in chamber 58 overcomes the opposing force of spring 56, the valve 48 will be moved toward the upstream valve seat 46 to restrict fluid flow from inlet 35 through valve body 34. The valve 48 will limit fluid flow to that which can be handled by the small internal relief valve 27 until the undesired downstream pressure condition is obviated. Then, as the downstream pressure is reduced, the spring 56 will overcome the pressure force in chamber 58 and bias the diaphragm assembly so as to move valve 48 from the upstream valve seat 46 and restore the gas regulator 10 to its normal operating condition. The relief monitor cooperates with the internal relief valve of the service regulator to provide protection at a predetermined pressure level without the necessity of restricting the inlet pressure to the regulator depending on the orifice size to the regulator. Full regulated capacity can be obtained and in the event of failure of the service regulator, the relief monitor limits the inlet pressure and discharge of gas to the atmosphere is minimal.

There has been provided by the present invention an improved gas service regulator incorporating a relief monitor which is compact and functions to prevent damage to the downstream system and appliances in the event of service regulator failure or malfunction. The relief monitor includes a valve for closing off the flow passage upstream of the regulator valve. This valve cooperating with a small capacity internal relief in the regulator, effectively protects the downstream system to a safe pressure while limiting the atmospheric discharge of gas to a nonhazardous level. The relief monitor is constructed and arranged so as to be automatically resetting after the failure that caused the high downstream pressure condition is remedied. The valve body of the regulator preferably incorporates annular valve seat means including an upstream valve seat coacting with the relief monitor valve and a downstream valve seat coacting with the regulator valve.

While I have shown a presently preferred form of the invention, it will be understood that the invention is not limited thereto, since it may be otherwise embodied within the scope of the following claims.

I claim:

1. For use with a service regulator including body means having a fluid inlet communicating with a source of fluid under pressure, a fluid outlet and a flow passage therethrough communicating said inlet and said outlet, annular valve seat means in the flow passage, valve means cooperating with the valve seat means for controlling the fluid flow passage, and pressure responsive actuating means operatively connected to said valve means for selectively actuating same to maintain a predetermined pressure downstream, the improvement comprising a relief monitor operatively connected to the body means for preventing damage to the connected appliances and the service regulator in the event of high downstream pressure with a minimum discharge of same to the atmosphere, said relief monitor including a valve member for controlling fluid flow through said flow passage and actuating means for moving said valve member including pressure responsive means for urging the valve member toward the valve seat means all the pressure responsive means being responsive to downstream pressure and means being provided for biasing the valve member away from the valve seat means whereby when the force of the downstream pressure overcomes the force of the biasing means, the valve member will move toward the valve seat means to restrict fluid flow through the flow passage.

2. A relief monitor as in claim 1 wherein the valve seat means includes an upstream valve seat and a downstream valve seat, the valve means cooperating with the downstream valve seat and the valve member cooperating with the upstream valve seat.

3. A relief monitor as in claim 1 wherein the pressure responsive means comprises a diaphragm means, and passage means are provided in said body means for communicating downstream pressure to said diaphragm means.

4. A mechanism as in claim 1 wherein the body means comprises a valve body having a wall therein with an opening therethrough, said annular valve seat means being secured in the opening in said wall, said valve seat means including an upstream valve seat and a downstream valve seat, said valve means coacting with the downstream valve seat and the valve member coacting with the upstream valve seat.

5. A mechanism as in claim 1 wherein the relief monitor coacts with a small internal relief valve in the service regulator to limit the discharge of gas to the atmosphere.

6. For use with a service regulator adapted to control fluid flow to a connected appliance, said service regulator including body means having a fluid inlet communicating with a source of fluid under pressure, a fluid outlet and a flow passage therethrough communicating said inlet and said outlet, annular valve seat means in the flow passage, valve means cooperating with the valve seat means for controlling the fluid flow through said flow passage, and pressure responsive actuating means operatively connected to said valve means for selectively actuating same to maintain a predetermined pressure downstream and relief means associated with said service regulator, the improvement comprising a relief monitor operatively connected to the body means and cooperating with said relief means for preventing damage to the connected appliances and the service regulator in the event of an excessively high downstream pressure condition with a minimum discharge of same to the atmosphere, said relief monitor being constructed and arranged so as to be automatically reset after the excessively high downstream pressure condition has been corrected, said relief monitor including a valve member for controlling fluid flow through said flow passage and actuating means for moving said valve member including pressure responsive means for urging the valve member toward the valve seat means.